Sept. 26, 1967　　　C. E. HAMMOND　　　3,344,432
ELAPSED TIME AND COST RECORDERS
Filed July 20, 1965　　　　　　　　　　　　2 Sheets-Sheet 1
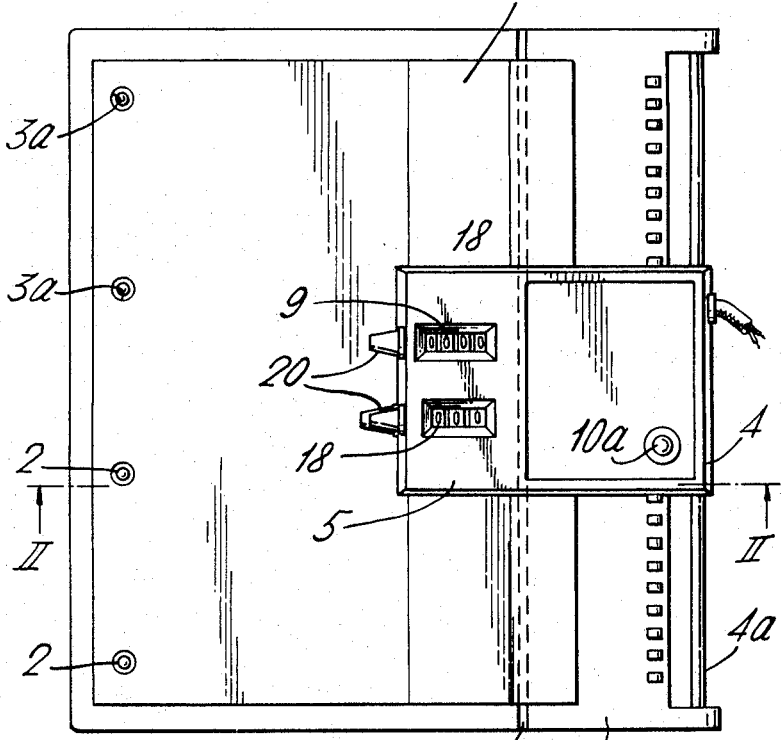
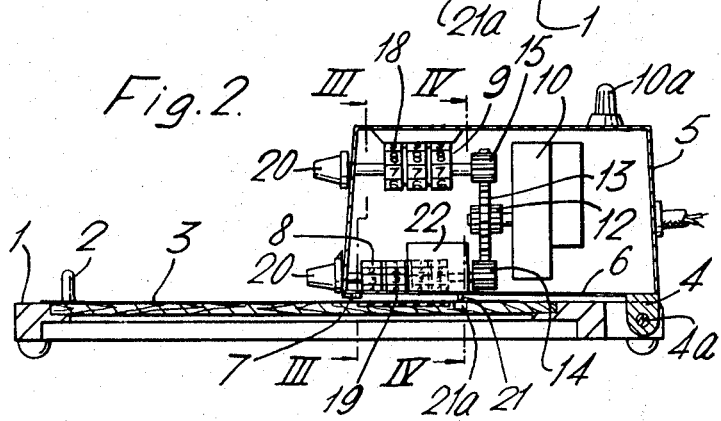
INVENTOR
Colin Edward Hammond
BY
Watson, Cole, Grindle & Watson
ATTORNEYS Sept. 26, 1967  C. E. HAMMOND  3,344,432
ELAPSED TIME AND COST RECORDERS
Filed July 20, 1965  2 Sheets-Sheet 2
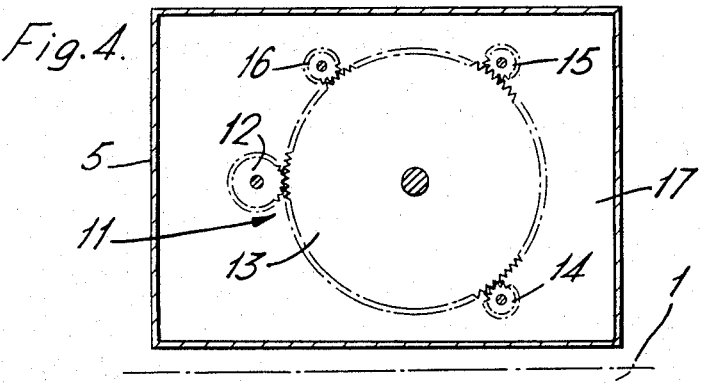
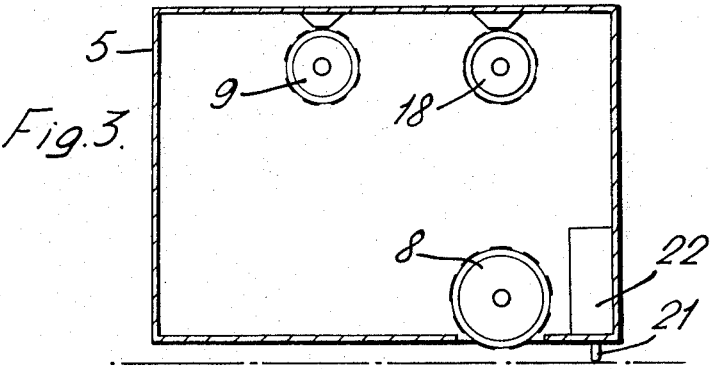
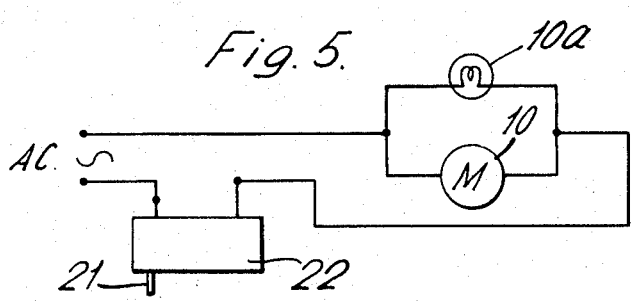
INVENTOR
Colin Edward Hammond
BY
Watson, Cole, Grindle + Watson
ATTORNEYS

United States Patent Office 3,344,432
Patented Sept. 26, 1967

3,344,432
ELAPSED TIME AND COST RECORDERS
Colin Edward Hammond, 19 Hampden Hill,
Beaconsfield, England
Filed July 20, 1965, Ser. No. 473,372
Claims priority, application Great Britain, July 27, 1964,
29,926/64; May 4, 1965, 18,774/65
6 Claims. (Cl. 346—95)

The invention relates to improvements in job timing devices particularly for use in assessing the time taken in carrying out the individual steps of a job, such as, for example, in servicing a tape recorder.

A common method of job timing at present in use involves the use of standard "clocking-in" clocks, the timing card being stamped by the clock at the start and finish of each job. However, with this method it is necessary in each case to subtract the starting time from the finishing time in order to obtain an assessment of the amount of time (in hours or minutes) spent on a particular operation. A further calculation is then necessary in order to assess the charge for the time spent. These calculations are subject to human error and frequently result in incorrect charges being made.

It is among the objects of the invention to provide a job timing device in which the number of units of time or the cash equivalent thereof spent on a job are entered directly on a card, the timing device operating independently of the daily time scale.

It is a further object of the invention to provide means whereby the total time or the cash equivalent thereof spent on a series of jobs may be totalled.

According to the invention, there is provided a device for timing one or more operations, comprising a counter adapted to record and print elapsed time, means for driving the counter, a recording card or the like adapted to be imprinted by the counter, and sensing means, effective upon engagement with the record card, to start the drive means.

The counter or counters may alternatively be adapted to directly record a cash amount corresponding to a particular charge per unit time for the total time expended on the job. Human error in calculating job time costs is therefore obviated.

According to a further feature of the invention, the drive for the counter or counters may be effected by a modified sun and planet mechanism wherein the motor drive shaft carries an orbitally fixed planet pinion which meshes with an idling sun gear. The sun gear in turn meshes with one or more counter drive planet pinions.

The device may also include a visual totalling counter for totallling the time taken on a series of operations and a visual repeater counter for the elapsed time recorded on the printing counter.

One embodiment of the invention is hereinafter described by way of example with reference to the accompanying drawings in which:

FIGURE 1 is a plan view of a job timer according to the invention,

FIGURE 2 is a sectional elevation on the line II—II of FIGURE 1,

FIGURE 3 is a sectional detail on the line III—III of FIGURE 2,

FIGURE 4 is a sectional detail on the line IV—IV of FIGURE 2, and

FIGURE 5 is a wiring diagram showing the electrical connections of the device.

Referring to FIGURES 1 and 2 of the drawings, a baseboard 1 is provided with locating pegs 2 for a timing card 3. The timing card 3 has holes 3a at the right hand edge which engage with pegs 2 so that card may be positioned on the board 1.

Hinged to one side of the board 1 by a horizontal sliding pivot 4 is a timer arm 5. The pivot slides on a horizontally secured rod 4a. The timer arm 5, which includes the timing mechanism described hereinafter, is normally maintained with the lower face 6 of the arm parallel to the board 1, by foam rubber pads 7 (FIGURE 3).

Mounted in the timer arm 5, are a single job time printing counter 8 and a visual totalling counter 9, driven by a common motor 10 through a gear train shown generally at 11 in FIGURE 2 and in front elevation in FIGURE 4. The gear train 11 is of the sun and planet kind where a motor driven pinion 12 meshes with an idler sun wheel 13. The sun wheel 13 meshes in turn with three pinions 14, 15 and 16 mounted on the drive shafts for the counters.

The gears 12, 13, 14, 15 and 16 are preferably mounted as a composite permanently enmeshed gear train on a support frame 17.

The motor 10 is connected in parallel with an indicator lamp 10a so that the operator is aware that a timing sequence is being carried out. The motor 10 is preferably a synchronous motor which runs at a speed of 1 revolution per minute so as to drive the counters 8 and 9 at a corresponding speed if the gears 12, 14, 15 and 16 are in 1:1:1:1 ratio.

Alternatively, by varying the gear ratios of the sun and planet gears, alternative rates of charge may be provided (where the recorder is adapted to directly record time costs).

A visual single job timing counter 18 may also be provided if required, which corresponds to the printing counter, so as to give an operator an immediate assessment of the time already used on a job.

The printing counter 8 is provided with an inking mechanism of conventional kind (not shown) which inks the type face 19 of the counter prior to each printing operation. A ribbon inker, as used on a conventional typewriter, may for example be provided.

The counters 8, 9 and 18 may each be reset by reset knobs 20 as required.

A sensing finger 21 projects downwardly from the extremity of the arm 5 under pressure from the spring of a microswitch 22. When no card is present on the board 1, the finger extends into a recess 21a in the board. The sensing finger 21 is effective, when compressed upwardly into the arm 5 to operate the microswitch 22 so as to close an electrical circuit (see FIGURE 5), which starts or stops the motor 10.

The motor 10, lamp 10a and microswitch 22 are connected as shown in FIGURE 5 to an alternating current electrical supply.

Referring particularly to FIGURE 2, the timing card is set out in two columns. The first column A records the "time taken" and extends beneath the type face of the printing counter 8. The second column B records the operation carried out and is filled in by the operator.

In operation, a timing card 3 would accompany a particular unit upon which work is to be done through the various operations to be carried out. Upon receiving the unit, the operator resets the printing counter (and counter 18 is fitted), to zero raises the timing arm 5, positions the timing card 3 for the unit and lowers the arm 5 so that the first vacant space in the "time taken" column 19 is beneath the printing counter 8. The arm 5 is supported clear of the card by the foam rubber pads 7.

The sensing finger is now prevented from entering the recess 18 and is compressed upwardly by the card 3. This movement is effective to operate the microswitch and thus close the electrical circuit to the motor 10, which starts.

The operator then commences work on the unit, the time spent being recorded by the counters single job timing 8 and 18.

At the completion of the operation the operator depresses the end of the arm 5, which compresses the pads 7 and imprints the time taken on the card 2 with the elapsed time recorded on the printing counter 8. The sensing finger 21 simultaneously operates the microswitch so as to stop the motor 10.

The counter 8 (and counter 18 if fitted), are then reset to zero for commencement of the next operation. The counter 9 records the totalled times for a series of operations and may be reset daily, weekly or as required.

It will thus be seen that after a series of operations upon a unit to be processed or serviced, the total work time or cost equivalent spent on the various operations may be immediately determined from the timing card which accompanies the unit.

If it is desired to directly record the charge for the time spent during the operation, the counters may be calibrated in units of currency. The ratios of the gear train 11 and/or the motor speed are adjusted so as to cause the desired charge per unit time to be recorded.

In order to provide for varying rates of charge between workmen, the gear train 11 and support frame 17 may be constructed so as to be detachable from the timing unit.

In such a construction, a number of such gear trains with varying gear ratios are associated with the device, each train representing a particular rate of charge which the device can record for a given motor speed.

Thus, in order to alter the rate at which time is charged, it is merely necessary to disengage and remove the gear train mounted on the device and replace it with the gear train corresponding to the desired rate of charge.

I claim:

1. A device for producing a visual record dependent on elapsed time, comprising, a base to support and locate a recording medium in visible position face-up thereon to receive printed indicia, a printing head, a printing counter in the head, fixed-speed electric drive means driving the counter, means making the head movable between an inoperative position clear of a recording medium on the base and an operative position over said base for printing upon a recording medium supported thereon when the head is depressed onto the medium, and means which senses head position and switches the drive means on and off on movement of the head respectively to and from the operative position.

2. A device as claimed in claim 1 wherein the base carries a bar at one side and the head is slidable along the bar to at least two different positions on the record and is pivotable thereon between said operative and inoperative positions.

3. A device as claimed in claim 1 wherein said sensing means includes a feeler element on the head operating the switching means upon contact with the recording medium as the head is brought to operative position.

4. A device as claimed in claim 3 wherein the base has a depression which receives the feeler in the absence of a recording medium on the base, whereby the drive means is not actuated unless a recording medium is present on the base.

5. A device for producing a visual record dependent on elapsed time, comprising a base to support and locate a recording medium face-up thereon, a printing head, a printing counter in the head, fixed speed electric drive means driving the counter, means moving the head between an inoperative position clear of a recording medium on the base and an operative position close to and immediately above a recording medium on the base, resilient means supporting the head in the operative position, the head in its operative position being located for printing on the recording medium by manually depressing the head thereon against the bias of said resilient means, sensing means effective to sense when the head is in its operative position, and means responsive to the sensing means to switch on the drive means.

6. A device as claimed in claim 5, wherein said resilient means comprise a foam rubber pad positioned to rest on the recording medium.

References Cited

UNITED STATES PATENTS

| | | | |
|---|---|---|---|
| 1,259,282 | 3/1918 | Prouty | 346—96 |
| 1,965,969 | 7/1934 | Sturtevant | 346—94 |
| 2,253,721 | 8/1941 | Meer | 346—14 |
| 2,454,025 | 11/1948 | Amend et al. | 346—95 |

RICHARD B. WILKINSON, *Primary Examiner.*

M. LORCH, *Assistant Examiner.*